United States Patent
Ganmor et al.

(10) Patent No.: US 9,532,562 B2
(45) Date of Patent: Jan. 3, 2017

(54) INSECT BLOWING AND SUCTION SYSTEM

(71) Applicant: THE STATE OF ISRAEL, MINISTRY OF AGRICULTURE & RURAL DEVELOPMENT, AGRICULTURAL RESEARCH ORGANIZATION (ARO) (VOLCANI CENTER), Beit Dagan (IL)

(72) Inventors: Shmuel Ganmor, Gedera (IL); Rafi Regev, Rishon Lezion (IL); Aharon Weiseblum, Moshav Nehalim (IL); David Ben-Yakir, Kfar Vradim (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI CENTER), Beit Dagan (IL)

( * ) Notice: Subject to any disclaimer, the term of this patent is extended or adjusted under 35 U.S.C. 154(b) by 70 days.

(21) Appl. No.: 14/399,168

(22) PCT Filed: May 7, 2013

(86) PCT No.: PCT/IB2013/053644
§ 371 (c)(1),
(2) Date: Nov. 6, 2014

(87) PCT Pub. No.: WO2013/168079
PCT Pub. Date: Nov. 14, 2013

(65) Prior Publication Data
US 2015/0264913 A1 Sep. 24, 2015

Related U.S. Application Data

(60) Provisional application No. 61/688,087, filed on May 8, 2012.

(51) Int. Cl.
*A01M 1/06* (2006.01)
*A01M 5/08* (2006.01)
(Continued)

(52) U.S. Cl.
CPC ............... *A01M 5/08* (2013.01); *A01M 5/00* (2013.01); *A01M 5/02* (2013.01)

(58) Field of Classification Search
CPC .. A01M 1/023; A01M 2200/012; A01M 1/06; A01M 5/08
(Continued)

(56) References Cited

U.S. PATENT DOCUMENTS 2,201,463 A * 5/1940 Williams ................ A01M 5/08
43/140
4,488,331 A * 12/1984 Ward ...................... A01M 1/14
15/339

(Continued)

FOREIGN PATENT DOCUMENTS

| | | |
|---|---|---|
| CN | 202160558 | 3/2012 |
| FR | 2890287 | 3/2007 |
| JP | H03290138 | 12/1991 |

*Primary Examiner* — Shin Kim
(74) *Attorney, Agent, or Firm* — Mark M. Friedman

(57) ABSTRACT

An insect blowing and suction system including at least two tangential blowers, each creating an air stream at a suitable angle relative to the ground but in opposite directions to each other. The two air streams combine and are diverted upward, thereby lifting insects upward. The upward air velocity is increased by at least one upper axial blower that sucks the air from the housing.

20 Claims, 3 Drawing Sheets

(51) Int. Cl.
 *A01M 5/00* (2006.01)
 *A01M 5/02* (2006.01)

(58) Field of Classification Search
 USPC .................................. 43/139, 140; 56/30–32
 See application file for complete search history.

(56) References Cited

U.S. PATENT DOCUMENTS

| | | | | |
|---|---|---|---|---|
| 4,825,582 A * | 5/1989 | Szynal | ..................... | A01M 5/08 43/139 |
| 5,004,446 A * | 4/1991 | Guong-Hong | ......... | A01K 57/00 43/112 |
| 5,117,578 A * | 6/1992 | Theis | ..................... | A01M 5/08 43/139 |
| 6,145,243 A * | 11/2000 | Wigton | ................... | A01M 1/02 43/107 |
| 6,840,003 B2 * | 1/2005 | Moore | ..................... | A01M 1/08 43/113 |
| 7,805,882 B2 * | 10/2010 | Wolf | ..................... | A01M 3/005 43/133 |
| 8,347,549 B2 * | 1/2013 | Durand | ................. | A01M 1/023 43/139 |
| 2004/0139648 A1 * | 7/2004 | Durand | ................. | A01M 1/023 43/139 |
| 2005/0268529 A1 * | 12/2005 | Durand | ................... | A01M 1/02 43/139 |
| 2006/0042155 A1 * | 3/2006 | Nolen | ................... | A01M 1/023 43/112 |
| 2006/0248786 A1 * | 11/2006 | Wolf | ..................... | A01M 3/005 43/139 |
| 2010/0287816 A1 * | 11/2010 | Abelbeck | .............. | A01M 1/023 43/113 |
| 2011/0030266 A1 * | 2/2011 | Roy | ........................ | A01M 1/08 43/113 |
| 2013/0025183 A1 * | 1/2013 | Durand | ................... | A01M 1/02 43/107 |
| 2015/0264913 A1 * | 9/2015 | Ganmor | ................... | A01M 5/08 43/139 |

\* cited by examiner

INSECT BLOWING AND SUCTION SYSTEM

TECHNICAL FIELD

The present invention relates to a system for the removal of harmful insects, and more particularly, to a system for the detachment of insects from vegetation, by means of suction and removal of the insects.

Many types of agricultural vegetation, mostly in greenhouses and particularly herbs, such as chives and parsley in greenhouses, are subject to severe damage by insects. Despite use of protective screens and chemical pesticides, the damage isn't sufficiently controlled. Likewise, there is a demand in kosher consumer markets, according to Jewish Halakha (Jewish Law), to provide clean produce that is completely free of insects, dead or alive. Insects can be detached and removed from the plants by means of suction with an air stream; however sufficiently effective achievement relies upon air stream performance strong enough to detach the insects from the plants in spite of their powerful grasp.

There is therefore a need for an insect suction system which will generate a powerful directed air stream on an area of influence that will detach and remove the harmful insects from all parts of the vegetation.

SUMMARY OF INVENTION

According to the present invention there is provided an insect blowing and suction system including: a suction assembly for creating an upward air stream, the suction assembly including a housing that includes a lower first end, and a lower second end; a first tangential blower located at the lower first end; and a second tangential blower located at the lower second end, wherein each of the first and second tangential blowers create respective air streams on the ground towards each other, the air streams combining to create an upward air stream into the housing, whereby insects on the ground are suctioned into the housing.

A basic insect blowing and suction system of the present invention is based on a suction assembly for creating an upward air stream. The suction assembly includes a housing with first and second lower ends and with first and second tangential blowers located at those lower ends. The tangential blowers create respective air streams along the ground towards each other. The air streams combine where they meet to create an upward air stream into the housing, thereby sucking up insects from the ground into the housing.

The first and second tangential blowers are oriented to blow air at a predetermined angle downward from a line drawn between the first tangential blower and the second tangential blower, and one or both of the first and second tangential blowers may include a heating mechanism for heating the air stream. The housing may also include an air inlet at the lower side between the lower first end and the lower second end for receiving the insects in the housing, and may include an air outlet at the upper side for allowing the insects to exit the housing and enter the bag or other collecting mechanism. The suction assembly preferably also includes an axial blower for creating an upward suction inside the housing, and preferably includes a collecting mechanism located above the housing for collecting the insects, such as a bag, perforated container, bin or cyclone.

Preferably, the system also includes a generator to power the suction assembly and a chassis to support the suction assembly and the generator, and one or more wheels connected to the chassis for moving the chassis along the ground. Preferably, the system also includes one or more height adjustment mechanisms connected to the chassis for raising or lowering either the whole chassis or just the suction assembly relative to the ground.

The first tangential blower is used since its air velocity and its drag force are more powerful for detaching insects than those of the suction of the axial blower, and the second tangential blower is incorporated in order to stop the insects from getting out of the housing and to help direct the insects into the suction air stream.

According to the present invention there is provided a method of removing insects from vegetation on the ground including creating a first air stream on the ground towards the vegetation, creating a second air stream on the ground towards the first air stream, the first and second air streams colliding and combining at at least a portion of the vegetation at a velocity powerful enough to remove insects from vegetation, and positioning a housing above the vegetation, to divert the combined first and second air streams upward into the housing, thereby suctioning insects from the vegetation into the housing. The method preferably also includes creating a suction inside the housing for urging the combined first and second air streams to flow upward into the housing. Preferably, the velocity of at least one of the first and second air stream is greater than the velocity of the suction. Preferably, the velocity of the diverted air streams is of a magnitude sufficient to detach an insect from vegetation. Either one or both of the first and second air streams may be heated to weaken the insects grip on the vegetation. The insects removed from the vegetation and suctioned into the housing may be collected in a collecting mechanism, such as a bag, perforated container, bin or cyclone which is positioned at the upper side of the housing where the insects exit the housing.

Additional objects and advantages of the invention will be set forth in part in the description which follows and, in part, will be obvious from the description, or may be learned by practice of the invention.

BRIEF DESCRIPTION OF DRAWINGS

The invention is herein described, by way of example only, with reference to the accompanying drawings, wherein.

The elements shown herein in the illustrations are presented in a manner that enables a clear understanding of their function, and the scales, size relations, and shapes do not in any way limit the scope of the invention.

DESCRIPTION OF EMBODIMENTS

The principles and operation of an insect suction system according to the present invention may be better understood with reference to the drawings and the accompanying description.

Unless otherwise defined, all technical and scientific terms used herein have the same meaning as commonly understood by one of ordinary skill in the art to which this invention pertains. The materials, dimensions, methods, and examples provided herein are illustrative only and are not intended to be limiting.

Figure 1:
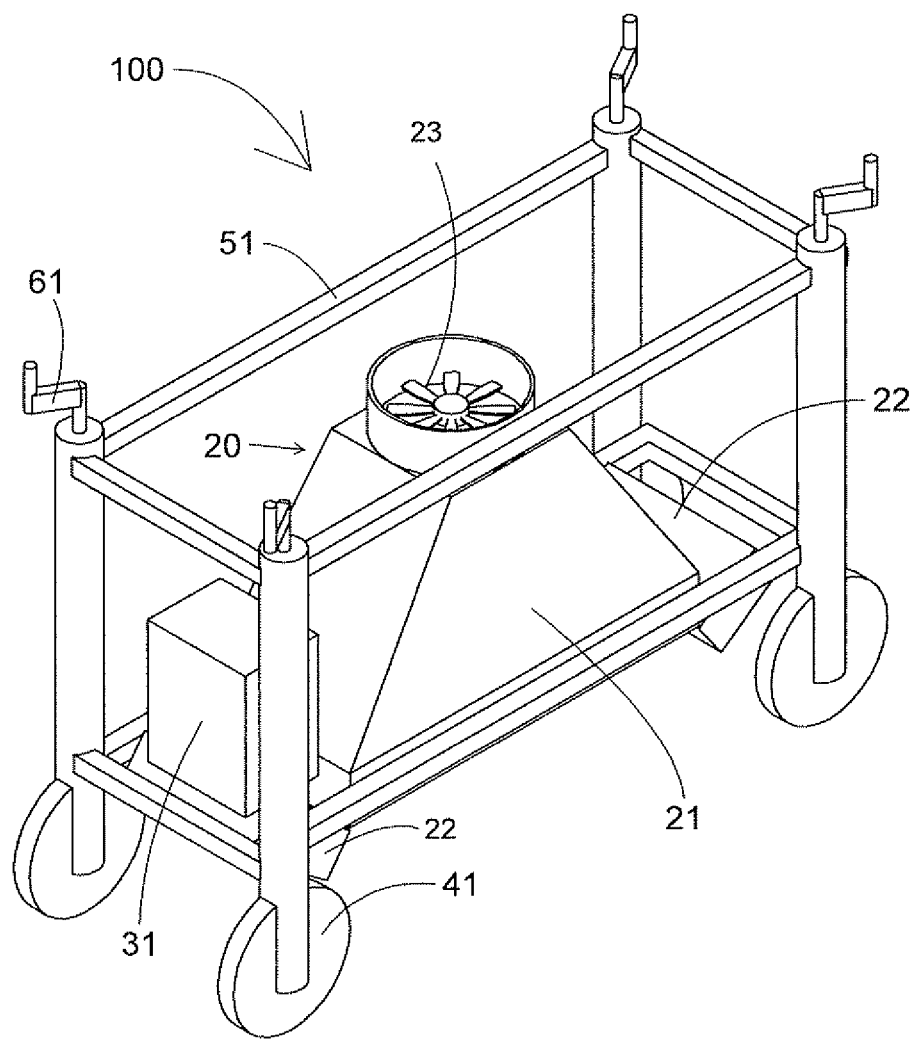
FIG. 1 is an isometric view of an exemplary, illustrative embodiment of an insect suction system according to the present invention.

The following is a legend of the elements described in the illustrations and accompanying description:
- 20 suction assembly
- 20w suction assembly width
- 20l suction assembly length
- 21 housing
- 21a housing wall
- 21il air inlet
- 21lfe lower first end
- 21lse lower second end
- 21ol air outlet
- 21u upper side
- 22 tangential blower
- 22a heating element
- 23 axial blower
- 24 tangential blower impeller
- 25 collecting bag
- 25a bag wall
- 31 generator
- 41 wheel
- 51 chassis
- 61 height adjustment mechanism
- 71 ground
- 71a ground surface
- 72 vegetation
- 81 air stream
- 91 insect
- 100 insect suction system
- α angle, measured between the direction of the air coming out of the tangential blower and the ground surface
- β angle, measured downward from an imaginary line connecting the two tangential blowers
- A area (the section area of the insect perpendicular to the air stream)
- D traveling direction
- F force
- $C_D$ drag coefficient
- V air stream velocity
- ρ air density Referring now to the drawings, FIG. 1 is an isometric view of an exemplary, illustrative embodiment of an insect suction system 100, according to the present invention.

Insect suction system 100 includes a carrying chassis 51, a suction assembly 20, a generator 31, wheels 41, and height adjustment mechanisms 61. Generator 31 can serve as a power source for the activation of two tangential blowers 22 and an axial blower 23, however this is in no way limiting their method of activation according to the present invention.

Chassis 51 is connected to four height adjustment mechanisms 61, each of which serves to calibrate the distance of one of the four wheels 41 from the suction assembly 20, in order to determine the distance between the suction assembly 20 and the ground (not shown in FIG. 1), which is required for conforming to the height of the vegetation, (not shown in FIG. 1). Note that the number of wheels 41 is not limited to four, and according to the present invention there can be any number of wheels, even just one wheel in a wheelbarrow-like configuration. In an alternative embodiment (not shown) a height adjustment mechanism may be positioned between the chassis and the suction assembly to raise or lower the suction assembly relative to the chassis (and hence the ground) while the height of the chassis remains fixed. While the insect suction system 100 shown in FIG. 1 is designed to be moved manually along the ground by pushing or pulling, other embodiments may be possible. For example it may include an engine for the purpose of self-propulsion, or it may be carried on a trailer or pulled by a tractor.

Figure 2:
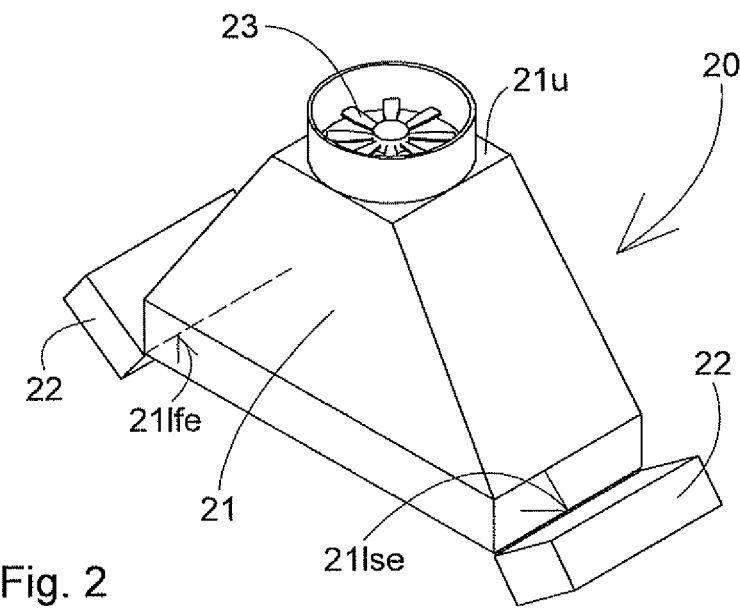
FIG. 2 is an isometric view of a suction assembly according to the present invention.

FIG. 2 is an isometric view of an exemplary, illustrative embodiment of a suction assembly 20. Suction assembly 20 includes a housing 21, two tangential blowers 22, and an axial blower 23. Housing 21 includes a lower first end 21lfe, a lower second end 21lse, and an upper side 21u. Each of lower first end 21lfe and lower second end 21lse of housing 21 is either touching or adjacent a tangential blower 22. Upper side 21u of housing 21 is either touching or adjacent to axial blower 23. Tangential blowers 22 are oriented inward-facing relative to housing 21 and angled downward such that air is blown towards each other and down, similar to a 'V'. Axial blower 23 is oriented upward-facing such that air is blown upward, creating a suction inside housing 21.

Figure 3:
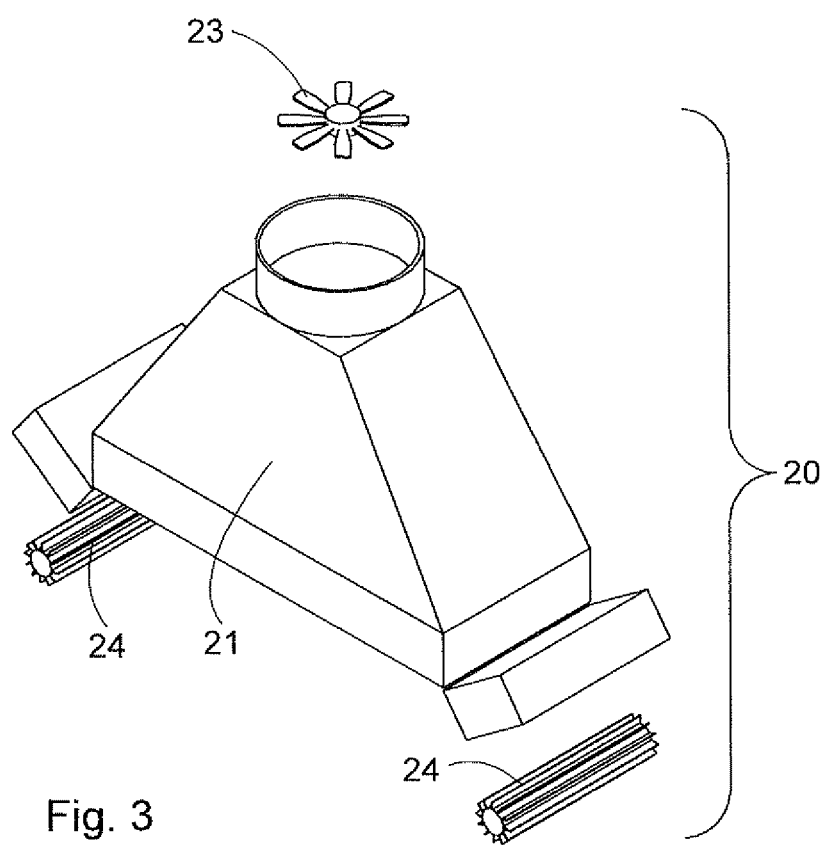
FIG. 3 is an exploded isometric view of a suction assembly according to the present invention.

FIG. 3 is an exploded isometric view of suction assembly 20, showing housing 21, axial blower 23 and tangential blowers 22 in which are tangential blower impellers 24.

Figure 4:
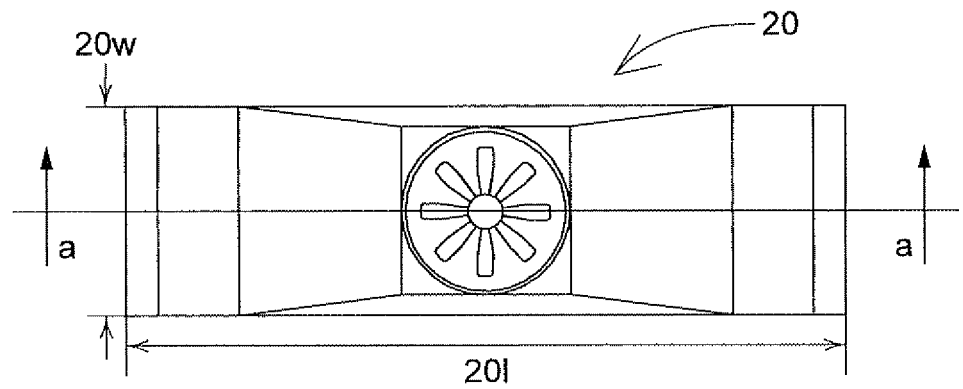
FIG. 4 is a top view of the suction assembly according to the present invention, upon which the section plane a-a is marked.

FIG. 4 is a top view of suction assembly 20 having a length 20l and a width 20w, and upon which the section plane a-a is marked.

Figure 5:
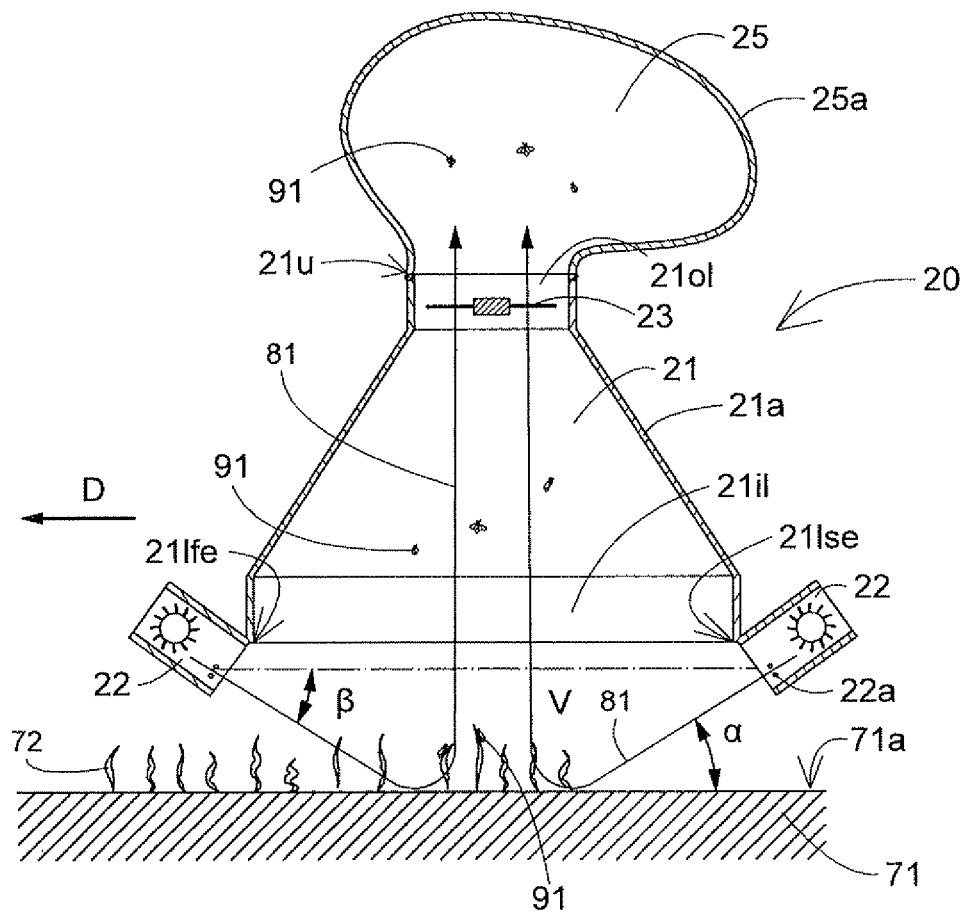
FIG. 5 is a cross-sectional side view through a-a of the suction assembly according to the present invention.

FIG. 5 is a cross-sectional side view of suction assembly 20 taken across a-a, which demonstrates its operation when used on vegetation.

In operation, air streams 81 are created by air movement caused by tangential blowers 22 and axial blower 23. The direction of air stream 81 emerging from each tangential blower 22 is at an angle α toward a ground surface 71a, and at an angle β downward relative to an imaginary line connecting the two tangential blowers 22.

When ground surface 71a is flat and suction assembly 20 is perpendicular to ground surface 71a:

$$\beta=\alpha.$$

Each air stream 81 created by tangential blowers 22 hits the ground 71, and becomes parallel to the ground surface 71a, whereupon they collide with each other and after pushing each other they combine into an upward stream, practically perpendicular to ground surface 71a the force of which is magnified by the suction created by axial blower 23. The angle β may be set to be bigger or smaller than α when one side of the system is raised or lowered more than the other side.

The traveling velocity of the suction assembly 20 in the traveling direction D is small relative to the air stream velocity V near ground surface 71a, and its effect on the air stream can be minimal.

Heating elements 22a can be added in tangential blowers 22, to heat the air, which will heat the insects 91, thus weakening their grip on the vegetation 72.

For the streaming air to detach an insect 91 from the vegetation 72 and move it upwards, it must activate a force F on the insect 91 that is equal to or greater than the insect's weight, and furthermore, greater than the grasp of the insect 91 on the vegetation 72. While it is well known to a person skilled in the art that a variety of factors influence whether or not any particular insect will be detached from the vegetation, the chances for detaching an insect are substantially increased when the air stream velocity V is at least:

$$V = \sqrt{\frac{2F}{\rho C_D A}}$$

The air stream velocity V is increased under the influence of the action of the axial blower 23.

The drag coefficient $C_D$ and the area A vary, of course, from one insect 91 to another, as does the force F.

Insects 91 that have been detached from the vegetation 72 travel upward in air stream 81 and enter housing 21 through an air inlet 21il, which is at the bottom side of the housing 21, and move between the housing walls 21a until they exit through the air outlet 21ol located at upper side 21u of the housing 21.

The spatial shape of housing walls 21a can be as shown in the present illustration, however they can also be in other shapes, and the shape affects the air stream regimen. Selection of the optimal shape for any given application is well within the ability of one ordinarily skilled in the art.

Likewise, the present invention is not limited to any specific ratio between the suction assembly width 20w and the suction assembly length 20l. Thus, for example, these dimensions can be equal.

Each insect 91 that emerges from air outlet 21ol is collected into a collecting bag 25 that has a bag wall 25a made of a sufficiently large net, with small enough holes to prevent the passage of the insects 91 however they do not significantly damage the air stream velocity V in the vicinity of the ground surface 71a. In other embodiments, an alternative collecting mechanism, such as a perforated container, bin or cyclone may be used in place of collecting bag 21 so long as the material from which the collecting mechanism is made is porous enough to allow air to escape while still capable of trapping insects inside.

The air streams coming out of the tangential blowers have momentum that keep the stream relatively narrow, whereas the air streams coming into the axial blower have no such momentum. Consequently, the air streams coming out of the tangential blowers maintain the air velocity for a longer distance, and the drag forces and the detaching forces it inflicts on insects are higher. Thus, the first of the two tangential blowers 22 is used since its air velocity and its drag force are more powerful for detaching insects inside the canopy than the air velocity and drag force of the suction of axial blower 23, and the second of the two tangential blowers 22 is incorporated both to stop the insects from getting out of housing 21 and to help direct the insects into the suction air stream.

Experimentally, satisfactory results were achieved when the air stream had a velocity of approximately 8 m/s in the area where the air starts flowing upward.

While the invention has been described with respect to a limited number of embodiments, it will be appreciated that many variations, modifications and other applications of the invention may be made.

What is claimed is:

1. An insect blowing and suction system comprising:
    a suction assembly for creating an upward air stream, said suction assembly including:
        a housing that includes a lower first end proximate to the ground, and a lower second end proximate to the ground; and
        a first and a second tangential blower, said first tangential blower located at said lower first end and including a first tangential blower impeller, said second tangential blower located at said lower second end and including a second tangential blower impeller, each of said first and second tangential blowers creating respective air streams via respective said tangential blower impellers which strike the ground and travel on the ground towards each other, said air streams combining to create an upward air stream into said housing, whereby insects on the ground are suctioned into said housing.

2. The system of claim 1, wherein said first and second tangential blowers are oriented to blow air downward in a predetermined angle measured from a line drawn between said first tangential blower and said second tangential blower.

3. The system of claim 1 at least one of said first and second tangential blowers includes a heating mechanism for heating said respective air stream thereof.

4. The system of claim 1, wherein said housing further includes an air inlet between said lower first end and said lower second end for receiving said insects in said housing.

5. The system of claim 1, wherein said housing further includes an air outlet in an upper side thereof, through which said insects exit said housing.

6. The system of claim 1, wherein said suction assembly further includes an axial blower for creating an upward suction inside said housing.

7. The system of claim 1, further comprising:
    a collecting mechanism above said housing for collecting said insects.

8. The system of claim 7, wherein said collecting mechanism is selected from the group consisting of a bag, perforated container, bin and cyclone.

9. The system of claim 1 further comprising:
    a generator to power said suction assembly.

10. The system of claim 9 further comprising:
    a chassis to support said suction assembly and said generator.

11. The system of claim 10 further comprising:
    one or more wheels connected to said chassis.

12. The system of claim 11 further comprising:
    a height adjustment mechanism connected to said chassis for raising or lowering said suction assembly relative to the ground.

13. A method of removing insects from vegetation on the ground comprising:
    creating a first air stream with a first tangential blower impeller positioned proximate to the ground, and directing said first air streak onto the ground towards the vegetation,
    creating a second air stream with a second tangential blower impeller positioned proximate to the ground, and directing said second air stream onto ground towards said first air stream, such that, said first and second air streams strike the ground and travel along the ground to collide and to combine at least a portion of the vegetation, and
    positioning a housing above the vegetation to divert said combined first and second air streams upward into said housing, thereby suctioning insects from the vegetation into said housing.

14. The method of claim 13 further comprising:
    creating a suction inside said ho sing for urging said combined first and second air streams to flow upward into said housing.

15. The method of claim 14, wherein the velocity of at least one of the first and second air stream is greater than the velocity of said suction.

16. The method of claim 13 further comprising:
heating at least one of the first and second air streams.

17. The method of claim 13 further comprising:
collecting the insects in a collection mechanism above said housing.

18. The method of claim 13, wherein the velocity of said diverted air stream is of a magnitude sufficient to detach an insect from vegetation.

19. The system of claim 1, wherein said lower first and second ends are oppositely disposed across a length of said suction assembly.

20. The system of claim 1, wherein the housing further includes a bottom surface that includes said lower first and second ends, said bottom surface being a substantially closest surface of said housing to the ground.

* * * * *

UNITED STATES PATENT AND TRADEMARK OFFICE
CERTIFICATE OF CORRECTION

PATENT NO. : 9,532,562 B2
APPLICATION NO. : 14/399168
DATED : January 3, 2017
INVENTOR(S) : Shmuel Ganmor It is certified that error appears in the above-identified patent and that said Letters Patent is hereby corrected as shown below:

In the Claims

Claim 14, Column 6:
Line 62: Change:
-- ho sing --
To:
"housing"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*